United States Patent Office 2,824,851
Patented Feb. 25, 1958

2,824,851

ACRYLIC ACID DERIVATIVES OF EPOXIDE RESINS AND METHOD OF CURING SAME

Myron W. Hall, St. Paul, Minn., assignor to Minnesota Mining & Manufacturing Company, St. Paul, Minn., a corporation of Delaware No Drawing. Application August 24, 1953
Serial No. 376,267

6 Claims. (Cl. 260—45.5)

This invention relates to heat-curing resinous compositions, to methods of preparing and curing the same, and to cured resinous products produced therefrom. More specifically, the invention relates to heat-curing compositions comprising an acrylic acid and resinous base materials containing epoxy radicals, more particularly those epoxy-containing materials commonly known as epoxide resins.

Typical epoxide resins are those which are produced by the reaction of epichlorhydrin and bisphenol A in the presence of a base such as sodium hydroxide and at elevated temperatures within the approximate range of 50°–150° C. The resulting resinous polyether is a complex mixture rather than a single chemical compound, but may be represented by the formula

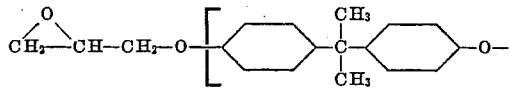

where $n$ has an average value between zero and about seven, depending for the most part on the relative proportions of bisphenol A and epichlorhydrin in the initial reaction mixture. Other polyhydric phenols, e. g. resorcinol, bis-(4-hydroxyphenyl)-1,1-isobutane, and various tris-phenols, may be substituted for the bisphenol A. Various other polyhydroxy compounds may likewise be substituted for the polyhydric phenols in preparing analogous resinous base materials useful for the purposes of this invention, ethylene glycol and glycerine being typical examples. The epichlorhydrin component likewise may be replaced by other compounds serving as equivalent reactive sources of epoxy radicals. In all cases, at least two such radicals occur in the resultant epoxide resin base molecule. The preparation of these epoxide resins has been adequately described elsewhere and forms no part of the present invention.

Epoxide resins by themselves are permanently thermoplastic, and require the addition of cross-linking agents or other reactive materials before they can be heat-cured. Organic acid anhydrides such as maleic anhydride or phthalic anhydride react with the resins to produce infusible resinous bodies. Alkaline catalyst agents, e. g. sodium hydroxide, piperidine, diethylamine, etc. promote the cross-linking of epoxide resins to the infusible state. These epoxide resins have also been reacted with organic acids such as the unsaturated free fatty acids derived from drying oils, to produce polyester type products which may subsequently be caused to polymerize, e. g. under similar conditions and in somewhat similar manner as do the drying oils.

The present invention provides a new means of cross-linking the epoxide resins, and makes possible the rapid heat-curing at moderate temperatures of initially liquid and easily pourable epoxide resin compositions to produce strong, tough, adherent, heat-resistant protective films, impregnants, massive resin structures, and other products. The resin composition prior to heat-curing is low in viscosity, preferred examples being liquid at normal room temperatures, so that effective saturation and impregnation of fibrous structures, wire coils, molds, etc. is readily achieved. It is relatively stable under normal storage conditions, i. e. has a useful shelf life, yet may be rapidly reacted and heat-cured. The cured product adheres firmly to most surfaces with which the material may be in contact during the curing operation, and is strong, tough, heat-resistant, and resistant to water and organic solvents. These properties indicate the utility of the products of the invention as encapsulating or potting compounds for protecting electrical coils and other components; as molding resins for forming intricately shaped parts for various electrical and mechanical uses; as resinous impregnating agents for paper, cloth, glass fiber, and other porous materials; as resinous adhesives or bonds for abrasive particles or other particulate material in the manufacture of abrasive-coated sheets, abrasive wheels, etc.; as resinous cements and adhesives for use in the manufacture of wooden, metal, glass, plastic and other structural members or articles; and for many other purposes.

The invention will now be further described and illustrated in terms of specific exemplary but non-limitative formulas and procedures. All proportions are given in parts by weight unless otherwise specified.

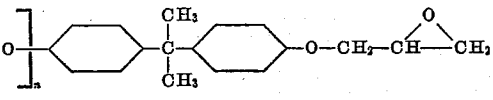

Example 1

| | |
|---|---|
| Epoxide resin | 100 |
| Acrylic acid | 25 |
| Triethylamine | 1 |

The epoxide resin is a liquid product obtained by reaction of epichlorhydrin and bisphenol A in a ratio of about 5:1, having a melting point of about 10° C., a hydroxy equivalency of about 80, and an epoxide equivalency of about 192. "Hydroxy equivalency" and "epoxide equivalency" refer to the number of grams of resin required, as calculated on the basis of analytical determinations, to provide one gram-equivalent weight of hydroxyl (—OH) or of epoxy

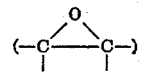

radical, respectively.

Preferably, the acrylic acid is first thoroughly blended with the liquid epoxide resin, and the triethylamine is then added and blended into the mixture, in many cases just prior to heat-curing, since this order of mixing is most effective from the standpoint of avoiding localized reaction and other difficulties. However, other mixing procedures may be used.

The resulting composition is a readily pourable, thin liquid at normal room temperatures, and will remain in this condition for at least ten days or more at normal room temperatures without noticeable increase in viscosity. Curing to a hard, tough, heat-resistant solid product is conveniently accomplished, in the case of a small laboratory test sample, by placing the sample in an oven at 90° C. for 5 hours, although complete cure may be obtained within much less time at the same or somewhat higher temperatures. The cured product does not soften at temperatures of 120° C. or somewhat higher, is not attacked by most common organic solvents or by strong acids or bases, and is water-resistant but not strongly organophilic.

Similar results are obtained with compositions in which the amount of acrylic acid is varied from about 10 to about 35–40 parts and the amount of triethylamine from about 0.01 to about 7 parts.

Below about 10 parts of acrylic acid the reaction is unduly retarded. More than about 35–40 parts of the acid produces a cloudy resinous product of reduced strength. These ratios will be seen to provide a ratio of carboxyl groups to epoxy groups of from about 1:4 up to about 1:1.

In the absence of triethylamine or equivalent catalyst the mixture of epoxide resin and acrylic acid is stable even at moderately elevated temperatures, such mixtures, for example, showing no significant increase in viscosity when held at 90° C. for as long as 3–4 days. Very small amounts of the amine component, e. g. about 0.01 part, are sufficient to catalyze the heat-curing reaction when properly distributed throughout the batch. Much larger amounts are also effective; but more than about 5–7 parts reduces the pot life of the liquid mixture, weakens the cured resinous product, and is difficult and disagreeable to handle. About one part of triethylamine, or other tertiary amine such as dimethyl benzylamine, is preferred. Primary and secondary amines are also effective although somewhat slower acting, the mechanism apparently involving preliminary conversion, by reaction with epoxide radicals, to the active tertiary amine form.

Example 2

In this example an epoxide resin prepared from the same reactants as that of Example 1 but in a 2:1 ratio is employed, the resin having an epoxy equivalency of 300–375, a hydroxy equivalency of about 105, and a melting point of about 43° C. With this resin, the amount of acrylic acid is reduced to 10 parts, and one part of triethylamine is added as the catalyst. The mixture is relatively stable at normal room temperature, and cures to a hard tough solid state within less than 6 hours at 90° C. Good results may also be obtained with up to about 45 parts of acrylic acid. Above this approximate proportion the cured mass is cloudy, indicating some incompatibility and inhomogeneity.

Still more rapid cures may be accomplished by adding catalytic small proportions of peroxide-type vinyl polymerization catalysts. For example, adding one part of tertiary-butyl peroxide to the liquid composition of Example 2 permits the curing of the mixture in one hour at 105° C., whereas in the absence of the peroxide the mixture remains as a viscous liquid when heated for the same time and at the same temperature.

The epoxide resin employed in the composition of Example 2 is a solid at normal room temperature, its nominal melting point being 43° C., and as such is not readily applied as an impregnant or encapsulating agent. Incorporation of the 10 parts of acrylic acid produces a mixture which is a viscous liquid at room temperatures. Higher amounts of the acrylic acid provide still further reduction in viscosity. At about 35–45 parts of acrylic acid, for example, there is obtained a mixture which is almost watery in consistency, and which therefore is highly suitable as an impregnant for wire coils, fabric or fibrous structures, or other structures containing voids which it is desired to fill. The liquid composition fills the voids completely and cures to a hard, tough, resistant solid state without expulsion of volatile solvents or reaction by-products, and the solid material remains firmly adherently bonded to the contacting surfaces.

Example 3

At a ratio of 1.5 parts epichlorhydrin to 1 part bisphenol A, an epoxide resin is produced which melts at 70° C., and has an epoxy equivalency of 450–525 and a hydroxy equivalency of about 130. A mixture of 100 parts of such resin with 7½ parts of acrylic acid and 1 part of triethylamine is found to remain liquid for one hour or somewhat more at 90–105° C. but to cure to a hard, tough and resistant state in 5 hours at 90° C. The addition of one part of tertiary-butyl peroxide increases the rate of cure at 105° C.

Somewhat similar results are obtained with compositions containing 5 parts or 10 parts of acrylic acid in place of the 7½ parts indicated.

Example 4

| | |
|---|---|
| Phenyl glycidyl ether | 30 |
| Epoxide resin as in Example 2 | 60 |
| Acrylic acid | 10 |
| Triethylamine | 1 |
| Organic peroxide catalyst (optional) | 1 |

Heating the composition of this example for one hour at 90° C. provides a cured polymer which is more rubbery than the comparatively hard and stiff polymers of the previous examples. The acrylic acid may be increased to 35–40 parts without producing a cloudy product.

Example 5

| | |
|---|---|
| Epoxide resin of Example 1 | 100 |
| Methacrylic acid | 25 |
| Triethylamine | 1 |
| Tertiary butyl peroxide (optional) | 1 |

The components were blended together, poured into a test cup, and heated to 105° C. in an oven. The blend cured to a hard, tough, heat-resistant solid mass in one-half hour at 105° C. In the absence of the peroxide catalyst the cure is somewhat slower at 105° C. At lower temperatures, e. g. at 90° C., the peroxide has no observable effect.

Methacrylic acid melts at 15–16° C. and like acrylic acid, which melts at 13° C., is a liquid at normal room temperatures. Each of these materials therefore may properly be considered as coming within the scope of the term "a normally liquid acrylic acid."

Example 6

| | |
|---|---|
| Epoxide resin of Example 2 | 25 |
| Phenyl glycidyl ether | 60 |
| Acrylic acid | 36 |
| Triethylamine | 1 |

The blend was heated at 90° C. and a rubbery product was obtained which did not lose its rubberiness and become hard in 24 hours at 90° C.

Example 7

| | |
|---|---|
| Phenyl glycidyl ether | 150 |
| Acrylic acid | 72 |
| Triethylamine | 7 |
| Diisopropylbenzene hydroperoxide (optional) | 5 |

The peroxide catalyst was not effective at 90° C. but served to increase the rate of cure at 105° C. The blend could be cured at either temperature. The cured product was softer and more rubbery than that of Example 6.

Although the foregoing examples provide only for the principal reactive components, it will be apparent that a wide variety of inert additives may be included where desired. Organic and inorganic fibers and powders, fillers, dyes, pigments, plasticizers, polymers, resins, etc. may be incorporated to provide improved toughness, color or opacity, to extend the volume and reduce the cost, and for various other reasons. Likewise other reactive components may be included, provided they do not interfere with the principal curing reaction heretofore characterized. For example, minor amounts of organic acids or anhydrides, e. g. acetic acid, or maleic or phthalic anhydride, or of olefinic components copolymerizable with acrylic acid, e. g. vinyl acetate or methyl acrylate (together with suitable vinyl polymerization catalysts or activators), may be added to the mixture to provide copolymers having widely different properties and characteristics without departing from the principles of the present invention.

The phenomena heretofore described in the examples appear to be specific to mixtures comprising acrylic or methacrylic acid, and epoxide resins containing, on the average, at least one, and preferably about two, epoxy radicals in the molecule, together with a tertiary amine or other equivalent catalyst, and with or without a peroxy catalyst for vinyl polymerization. In probable explanation of the results obtained, it is postulated that carboxyl radicals react rapidly with epoxy radicals in the presence of the amine to form ester linkages and hydroxyl radicals, and that vinyl polymerization thereupon takes place rapidly between the unsaturated acrylate chains, while further cross-linking takes place directly between free hydroxyl groups and unreacted epoxy radicals of the epoxide resin molecules. The rapidity of the reaction is surprising, particularly in view of the relatively very slow rate of esterification between epoxide resins and the free fatty acids of drying oils, and the difficulties experienced in curing such products in the absence of metallic driers or oxygen and in other than thin film form. But regardless of theory, the present invention provides a new and useful result in the form of a normally liquid composition comprising an epoxide resin and an acrylic acid which is usefully stable at room temperatures while being rapidly reactive at moderately elevated temperatures to a fully cured, tough, adherent resin product.

What is claimed is as follows:

1. A composition of matter in liquid form free of volatile vehicle and consisting essentially of a dihydric phenol glycidyl polyether having more than one epoxy radical per molecule, at least one liquid organic carboxylic acid of the class consisting of acrylic acid and methacrylic acid, and an amine catalyst; the ratio of epoxy radicals to carboxyl radicals being about 1:1 to about 4:1, and the weight of amine catalyst being about 0.01–7.0 percent of the weight of the glycidyl polyether.

2. A structure including as a hard, tough, heat-resistant, thick-sectioned homogeneous resinous component the heat-cured composition of claim 1.

3. The method of curing a dihydric phenol glycidyl polyether having more than one epoxy radical per molecule, to a hard, tough, heat-resistant state, including blending with said polyether at least one liquid organic carboxylic acid of the class consisting of acrylic acid and methacrylic acid in an amount sufficient to provide a ratio of epoxy radicals to carboxyl radicals of about 1:1 to about 4:1 and an amine catalyst in an amount of about weight equal to about 0.01–7.0 percent of the weight of said glycidyl ether material, and then heating the blend.

4. A composition of matter in liquid form free of volatile vehicle and consisting essentially of (a) at least one glycidyl ether of a hydroxy compound of the class consisting of phenol, polyhydric phenols, and polyhydric aliphatic alcohols, said glycidyl ether having at least one epoxy radical per molecule, (b) at least one liquid organic carboxylic acid of the class consisting of acrylic acid and methacrylic acid, and (c) an amine catalyst; the ratio of epoxy radicals to carboxyl radicals being about 1:1 to about 4:1, and the weight of amine catalyst being about 0.01–7.0 percent of the weight of said glycidyl ether.

5. A structure including as a thick-sectioned homogeneous resinous component the heat-cured composition of claim 4.

6. The method of curing a glycidyl ether composition containing at least one glycidyl ether of a hydroxy compound of the class consisting of phenol, polyhydric phenols, and polyhydric aliphatic alcohols, said glycidyl ether having at least one epoxy radical per molecule, said method including blending with said glycidyl ether at least one liquid organic carboxylic acid of the class consisting of acrylic acid and methacrylic acid in an amount sufficient to provide a ratio of epoxy radicals to carboxyl radicals of about 1:1 to about 4:1 and an amine catalyst in an amount by weight equal to about 0.01–7.0 percent of the weight of said glycidyl ether, and then heating the blend.

References Cited in the file of this patent

UNITED STATES PATENTS

| | | |
|---|---|---|
| 2,129,685 | Graves | Sept. 13, 1938 |
| 2,331,265 | Coleman et al. | Oct. 5, 1943 |
| 2,456,408 | Greenlee | Dec. 14, 1948 |
| 2,575,440 | Bradley | Nov. 20, 1951 |
| 2,592,560 | Greenlee | Apr. 15, 1952 |
| 2,604,463 | Bilton et al. | July 22, 1952 |
| 2,604,464 | Segall et al. | July 22, 1952 |